United States Patent [19]
Clough, Jr.

[11] 3,788,616
[45] Jan. 29, 1974

[54] AGITATING AND AERATING APPARATUS

[75] Inventor: Roy L. Clough, Jr., Bristol, N.H.

[73] Assignee: Xodar Corporation, Warwick, R.I.

[22] Filed: Apr. 21, 1972

[21] Appl. No.: 246,385

[52] U.S. Cl..................... 261/64 R, 261/81, 261/93
[51] Int. Cl............................................... B01f 3/04
[58] Field of Search...................... 261/64 R, 81, 93

[56] References Cited
UNITED STATES PATENTS
3,664,647   5/1972   Snow et al. ...................... 261/64 R

*Primary Examiner*—Frank W. Lutter
*Assistant Examiner*—Steven H. Markowitz
*Attorney, Agent, or Firm*—Robert J. Schiller et al.

[57] ABSTRACT

The invention is a system for simultaneously aerating and agitating a body of liquid. The system comprises a body that is pivotally mounted in the liquid with its pivot point located intermediate its ends, and means for feeding air to the lower side of the body. The body is adapted to trap alternately at each end sufficient air to cause that end to rise in the liquid, and means are provided for releasing the air trapped at each end of the body when that end has risen a predetermined amount, with the result that the body oscillates on its pivot axis in see-saw fashion.

20 Claims, 8 Drawing Figures

PATENTED JAN 29 1974   3,788,616

AGITATING AND AERATING APPARATUS

This invention relates to the contacting of liquids and gases and more particularly to aeration and agitation of sewage and industrial wastes, stagnant ponds, rivers, pools and the like.

It is common practice in modern aerobic sewage and industrial waste disposal processes to aerate waste effluents to reduce the amount of oxygen required for complete oxidation of suspended organic solids when subsequently discharged from the treatment system into a river or the sea. In a growing number of localities, statutes require that the Biological Oxygen Demand (i.e., to amount of oxygen required to oxidize a given amount of waste discharge) not exceed predetermined limits. Accordingly, efficient and reliable aerating equipment is required to adequately aerate the large volumes of liquid effluents which modern waste treatment plants must handle. The usual practice is to direct air or oxygen into holding lagoons or tanks in finely divided form so that it will pass upwards through the body of liquid and thereby oxidize suspended organic matter. The duration of the aeration cycle is a matter of days, ranging up to about 60 days in lagoons and up to about 30 days in tanks equipped with agitating devices. Once aeration has been completed, the effluent is filtered to remove remaining solids, chlorinated and then discharged into a river or sea.

Various types of means for effecting aeration as above described have been adapted and put into use, as exemplified by U.S. Pat. Nos. 3396950, 3063689, 3470091, 3347537, 3182978, 2815943, 2947525, 3133130, and 3490752.

Generally speaking, increased aeration results in increased improvement in the efficiency of waste treatment. However, aerating means heretofore known have not been fully satisfactory. Among the limitations of aerating systems now in use or previously known are high installation and maintenance costs, low efficiency resulting in high air input requirements and long aeration cycles, and inability to agitate sludge.

Accordingly, the primary object of this invention is to provide a novel method for aerating liquids such as sewage and industrial wastes in holding lagoons or other containers such as moats, pools, tanks and the like.

A more specific object is to provide improved apparatus for aerating liquid that is relatively inexpensive to install, maintain and operate, and which is adapted to release the aerating gas in a manner that provides rapid and uniform dispersion in the form of small bubbles throughout the body of liquid.

A further specific object is to provide novel waste treatment apparatus that combines the functions of aeration and sludge agitation.

Still another object is to provide novel apparatus for agitating a body of liquid.

The foregoing and other objects hereinafter described or rendered obvious are achieved by means of a water displacing body which is pivotally disposed in a holding lagoon or tank. Means are provided for injecting a gas below the body. The body is adapted to trap the gas alternately at each end thereof so as to provide a buoyancy force at each end that causes said each end to rise in the liquid, and means are provided to release air trapped at each end as that end rises, whereby the body oscillates in a see-saw manner. The oscillating action of the body agitates the liquid in the lagoon or tank and the released air aerates the liquid.

Other features and advantages of the invention are described or rendered obvious in the following detailed description which is to be considered together with the accompanying drawings wherein.

Figure 1:
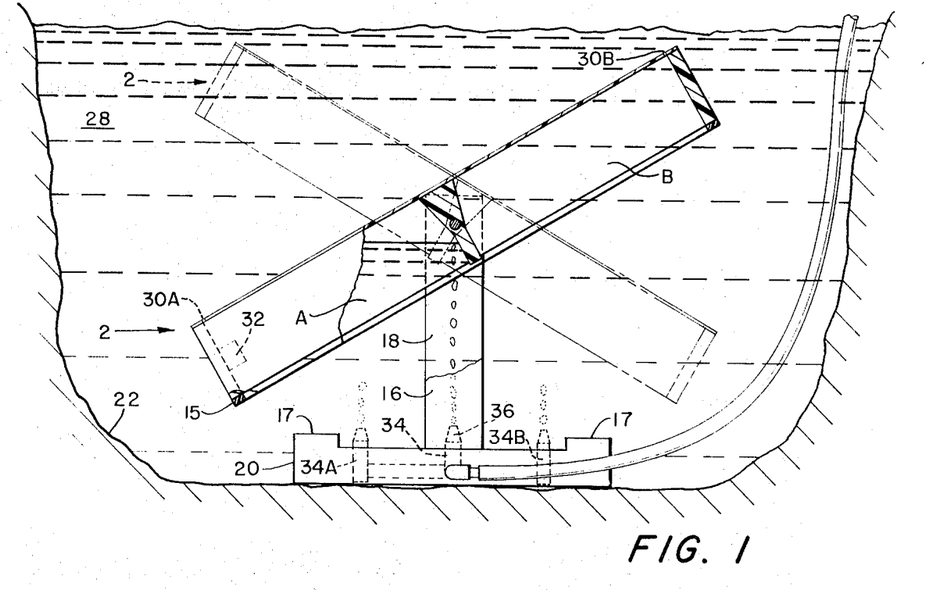
FIG. 1 is a side elevational view, partly in section, of one embodiment of an aerating and agitating body constructed in accordance with the invention, mounted in a lagoon.
Figure 2:
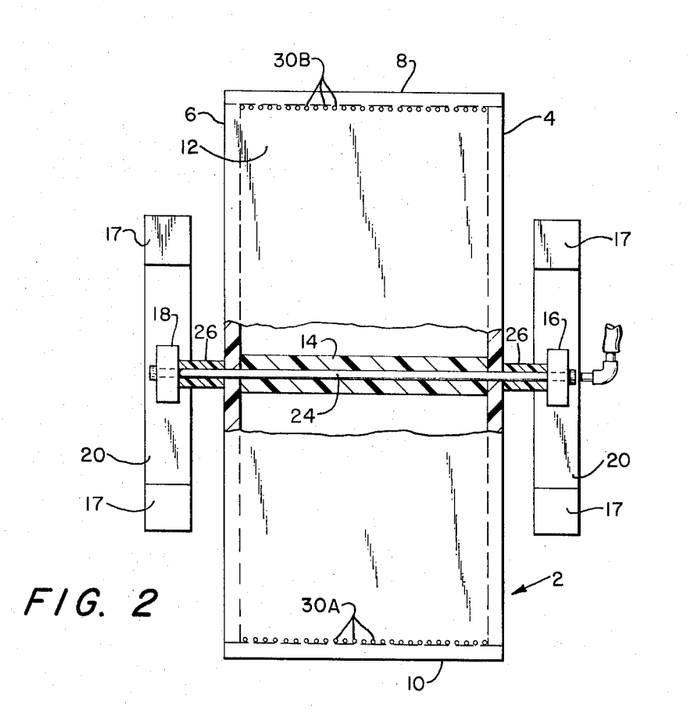
FIG. 2 is a plan view, partly in section, of the body of FIG. 1.
Figure 3:
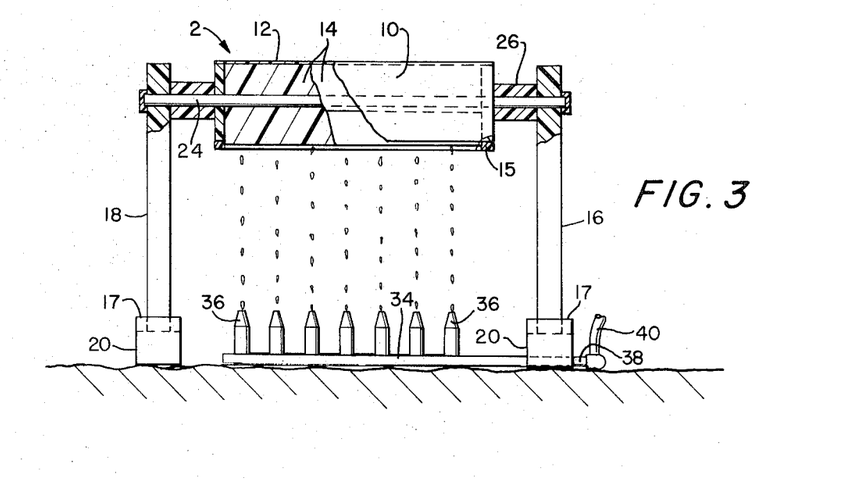
FIG. 3 is an end view in elevation, partly in section, of the same apparatus.

Referring now to FIGS. 1-3, the illustrated aerating and agitating apparatus comprises a box-like body 2 that has a rectangular frame formed by side members 4 and 6 and end members 8 and 10 and a wall member 12 that overlies and is secured to the frame. The body also includes a centrally located baffle plate 14 that extends between the side frame members 4 and 6. Preferably the wall member 12 also is secured to baffle plate 14. The body is pivotally mounted to a pair of spaced vertical supports 16 and 18 that are affixed to identical base member 20 that rest on the bottom of a liquid holder 22 that may be a holding lagoon, moat, pond or the like. This is accomplished by means of an axle or pivot shaft 24 that extends through a bore in the baffle plate and aligned holes in side frame members 4 and 6 and is anchored in the supports 16 and 18. The body 2 is rotatable on axle 24 and is restrained against sidewise movement by spacers 26 mounted on the axle. The body 2 per se can have a negative, neutral or positive buoyancy in the liquid. However, the overall buoyancy of the apparatus should be negative (or the support structure anchored in place in the holder 22) to prevent it from floating to the surface. Thus, if the body 2 per se has a positive buoyancy, the supporting structure must have an offsetting negative buoyancy or else be ballasted or anchored so that the apparatus will remain submerged in the liquid. If the support structure is not anchored, the overall buoyancy of the apparatus should be sufficiently negative to keep it submerged even when the body 2 is being subjected to the lifting force of air injected as hereinafter described.

Accordingly, by way of example, but not limitation, the body 2, supports 16 and 18, and base members 20 all may be made of metal or a material such as wood or plastic. If necessary, as when the body 2 or its supporting structure is made of a material having a positive or neutral buoyancy, e.g. wood or a light weight plastic composition, the apparatus may be ballasted, e.g. by metal plates 15 and 17. It is also contemplated that the frame members 4-10 and the supports 16 and 18 and/or the bases 20 may be hollow and filled with a suitable ballast such as sand or gravel so as to provide adequate negative or neutral buoyancy. Preferably the wall member 12 is a sheet of a substantially rigid plastic that is resistant and impervious to water, e.g., polyethylene or polypropylene. Such a plastic sheet is preferably cemented to the frame members 4–10 (which also are preferably plastic) so that a strong, water-tight seal is formed around its entire perimeter.

It is to be noted that the baffle plate 14 extends below the plane of the frame of the body and also effectively subdivides the interior of the body 2 into two compartments A and B. Additionally, each end of the body has one or more rows of small air discharge openings 30 formed in the wall member 12. If the illustrated apparatus is to function as both an aerating and agitating device, the discharge openings 30 are made quite small and are numerous, preferably having a size no greater than about one-sixteenth inch in diameter and being spaced about one-half to 1 inch apart and in at least two or three rows spaced apart about one-half to 1 inch. The use of small discharge openings assures that air trapped in the chambers A and B will escape in the form of very small bubbles during operation of the device as hereinafter described. Production of small air bubbles is essential for aeration since the smaller the bubbles the more readily the oxygen is dissolved in the water being treated. If the apparatus is to function primarily as an agitating device, larger but fewer discharge openings may be provided in wall member 12. However, these larger openings should be located as close as possible to the respective ends of the body 2. Thus, further by way of example, if agitation is the sole requirement, the holes may be one-eighth to 2 inches and may be located on 3–4 inch centers.

It also is desirable for the body 2 to be slightly unbalanced on the pivot shaft so as to assure that it will commence to oscillate as hereinafter described as soon as introduction of air is initiated. If the body is not slightly unbalanced, ballast, e.g. in the form of lead weight 32, is secured to one end of the frame.

Also forming part of the apparatus of FIGS. 1–3 is an air feeding means in the form of a manifold 34 that is disposed on the bottom of the liquid holder directly beneath the axle 24 and has a plurality of horizontally spaced, vertically directed outlet nozzles 36. The inlet end 38 of manifold 34 is connected by a flexible hose 40 to a suitable air supply means (not shown). The gas supply means may consist of a compressor supplying air to a plenum to which the air hose is connected; preferably, however, the air supply consists of a variable flow rate air pump driven by an electric motor.

Operation of the apparatus of FIGS. 1–3 whereby agitation and aeration are produced will now be described. Assuming that the body 2 is fully submerged in waste effluent 28, has a negative buoyancy, and is unbalanced by ballast 32, and further that no air is flowing through the hose 40, compartments A and B will be filled with effluent, and compartment A will fall due as a result of ballast 32. Air is now introduced via hose 40. The air is discharged from nozzles 36. Since the manifold 34 is located directly below the pivot axis of body 2 and the body and the baffle 14 are inclined as shown in FIG. 1, air discharged by nozzles 36 rises and tends to accumulate in compartment A of the body. The air will displace the effluent in compartment A and as the volume of air accumulating in compartment A increases, that part of the body located to the left of the pivot axis (as seen in FIG. 1) will begin to assume positive buoyancy and will begin to rise, i.e., the body will pivot clockwise. The body will continue to pivot in this direction until such time as its compartment A section has moved up far enough for the air trapped in compartment A to reach holes 30A, at which time the air will commence to escape through the holes in the form of small bubbles. Once the bottom end of baffle 14 has swung past the six o'clock position, the air being discharged by manifold 34 will be directed by the baffle into compartment B. As a consequence, the compartment B section will begin to assume a positive bouyancy as the compartment A section returns to its normal negative buoyancy condition; with the result that the body 2 is urged to pivot counterclockwise. This clockwise movement continues until the air trapped in compartment B can escape through the holes 30B, and then the body will again reverse its pivotal movement. The body will continue to oscillate on its pivot with the frequency depending upon the number and size of the holes 30, the volume of the compartments A and B, and the rate at which air is discharged from manifold 34. It is to be noted that as the aerating body pivots in the lagoon it agitates the effluent and thereby helps keep the solid waste material in suspension in the effluent so that it can be more uniformly aerated. Additionally, the escaping gas bubbles provide efficient aeration due to intimate contact with the effluent.

It is to be noted also that the holes 30A,B serve two functions. One function is to release the gas in very small bubbles so as to provide more intimate contact with the effluent. The second function is to determine the angle to which the aerating body can tilt, since the closer the holes are to the end of the body, the longer it takes for the trapped air to escape. If the holes 30 are omitted, the aerating body will tend to pivot to a greater angle in the lagoon, i.e. to an angle such as to permit the gas trapped in the rising compartment to escape from under the end of the frame. While the gas released in this manner will accomplish some aeration, it is not as desirable since the gas will not be released as small bubbles.

Figure 4:
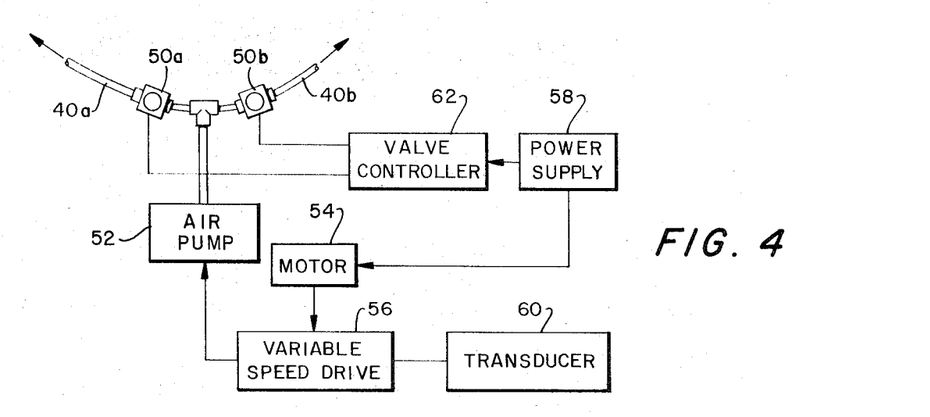
FIG. 4 is a schematic representation of one form of controllable air supply system for operating the pivotal body of FIG. 1.

Obviously the aerating body may be oriented so that its axle extends either transversely or longitudinally in the lagoon. Furthermore, more than one aerating body may be used in the same lagoon and they may be located either close together or in widely spaced relation to each other. Also, the single gas manifold 34 can be replaced with two manifolds 34A and 34B that are spaced apart so that one is located under compartment A and the other is located under compartment B, with air being supplied alternately to each manifold. FIG. 4 illustrates schematically one form of gas supply system for operating an arrangmenet of two gas manifolds as shown in phantom in FIG. 1.

Referring now to FIG. 4, the illustrated system comprises two solenoid-controlled valves 50a, 50b having their discharge ports connected to separate hose lines 40A and 40B that are connected to manifolds 34A and 34B respectively. The inlet ports of valves 50a, 50b are connected to an air source comprising an air pump 52 and a constant speed electrical motor 54 that drives the pump through a variable speed drive 56 which acts as an air source controller. The motor is energized by a suitable power supply 58. By way of example, the air source may be a Model 325 motor-driven air pump produced by Schwitzer Division of Wallace-Murray Corp. of Indianapolis, Indiana. The variable speed drive 56 is adapted to vary and control the pump speed and thus the rate at which air is supplied to the aerating bodies. The variable speed drive may take various forms and may be adapted for manual control or for automatic control and may be operated according to measured characteristics of the effluent. By way of example, the variable speed drive may be an electromagnetic particle clutch of suitable size embodying, for example, the type of construction described in U.S. Pat. Nos. 3394783 or 3394784, with the degree of clutching between the motor's output shaft and input shaft of the pump depending upon the amount of current supplied to the energizing coil of the clutch. Alternately the variable speed drive may be a Reevestype electrically controlled unit or an eddy coupling as described in Fitzgerald, Basic Electrical Engineering, pp. 422–423 McGraw-Hill (1945). A further suitable variable speed control arrangment is provided by replacing motor 54 with a variable speed d.c. motor and replacing the variable speed drive with a rheostat or potentiometric type controller. It is preferred that the air source controller be able to vary the rate of air flow, e.g. through control of motor 54 or variable speed drive 56, in response to an input signal derived from one or more transducers 60 which are adapted to measure important characteristics of the effluent such as temperature or pH or oxygen content and to supply an input signal to the controller that varies in accordance with the measured characteristics. By way of example, the transducer 60 may be a temperature-measuring device, e.g. of the resistor bulb-type, or an electrode for measuring pH or oxygen content such as shown in U.S. Pat. Nos. 2705220, 2232211 and 2913386, such transducer or transducers being disposed at a suitable location in the effluent in the lagoon so as to continuously monitor the effluent as it is being aerated and agitated. It is to be noted that the bacterial action proceeds slower at low temperatures and overoxygenating may kill the bacteria. Hence, temperature monitoring may be required in those installations where large changes in temperature are likely to occur.

Operation of the solenoid valves 50A, 50b is determined by a suitable valve controller 62 which is adapted to that valve 50a and 50b will supply air to only one manifold 34A or 34B at a time. Valve controller 62 may be a cam-type motor-driven controller comprising a cam which operates switches that control energization of the solenoids of valves 50a and 50b from power supply 58. Alternatively, the valve controller 62 may be adapted to operate in response to sensors (not shown) that are mounted at the ends of the pivoting body and are responsive to the vertical positions of such ends.

Figure 5:
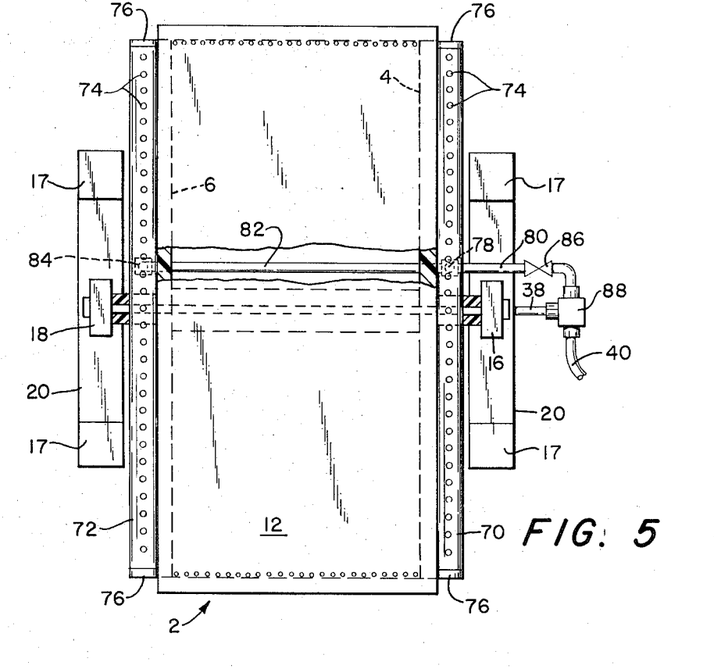
FIG. 5 is a plan view, partly in section, of another embodiment of the invention.

FIG. 5 shows still another modification of the invention. The embodiment of FIG. 5 is the same as that of FIGS. 1–3, but includes supplemental aeration means in the form of two hollow pipes 70, 72 that are mounted on the outer sides of the side frame members 4 and 6 respectively. Pipes 70, 72 are provided with a series of small discharge openings 74, preferably arranged in one or more laterally extending rows, and are sealed at both ends by caps 76. Preferably the pipes (and optionally the caps as well) are made of a porous plastic or ceramic, in which case the openings 74 may be the pores in the pipe material. Porous plastic pipe is available, e.g. the Micropore pipe produced by the Borg Warner Company, Inc., that has a relatively large number of pores, typically 1,000 or more pores per linear inch for nine-sixteenths inch diameter pipe. Pipe 70 has an air inlet in which is mounted a tee fitting 78 that also is connected to an air supply hose line 80 and a second hose line 82 that extends across under the body 2 and connects to a fitting 84 mounted in an air inlet in pipe 72. The air supply hose 80 is connected via a valve 86 to one side of a tee 88 that also is connected to the inlet 38 of manifold 34 and also to the main air supply hose 40.

The apparatus of FIG. 5 has the same mode of operation as the apparatus of FIGS. 1–3, except that a greater degree of aeration is provided due to escape of air bubbles from each of the pipes 70 and 72 at the same time as bubbles escape via the holes 30a or 30b. The amount of air fed to the pipes 70 and 72 can obviously be controlled by adjustment of valve 86. An advantage of this arrangement is that a more uniform dispersion of aerating gas is achieved since the gas is introduced into the liquid simultaneously along the entire length of the pivotal body. Obviously, the gas supply means can be separately connected to hollow pipes 70 and 72. Also, if desired, pipes 70 and 72 can be omitted and the side frame members 4 and 6 of the body can instead comprise hollow pipes having discharge holes or pores similar to pipes 70 and 72, and with each such pipe having a gas inlet that is coupled to the air supply by appropriate hose lines or pipes.

Figure 6:
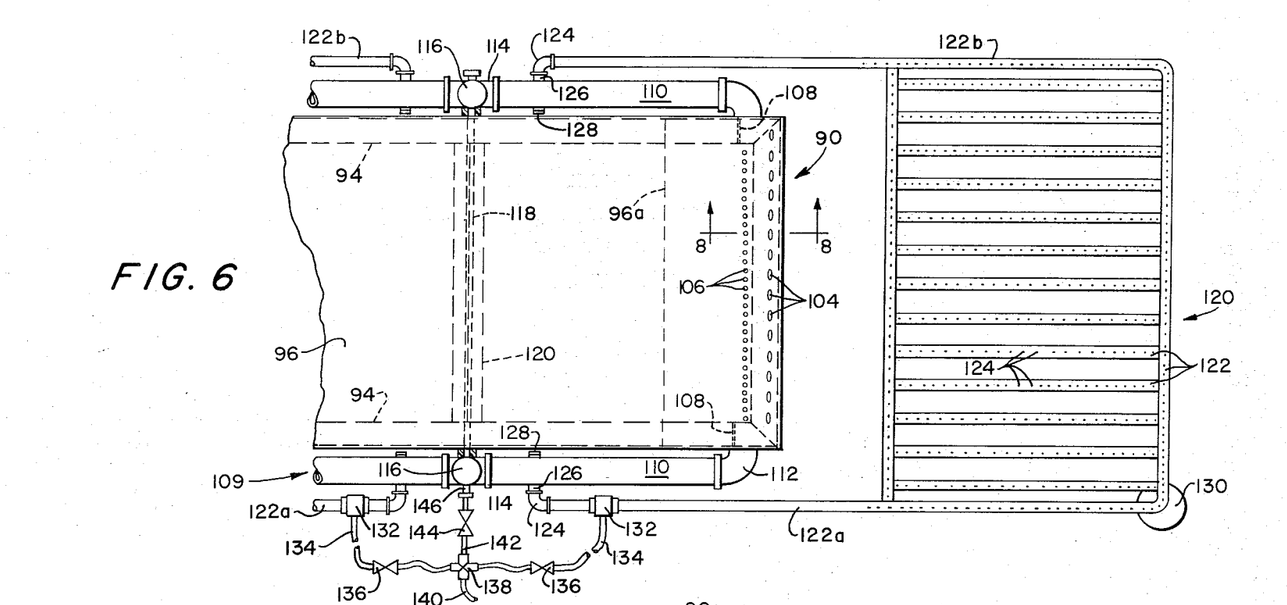
FIG. 6 is a plan view, with a portion broken away, of a preferred embodiment of the invention.
Figure 7:
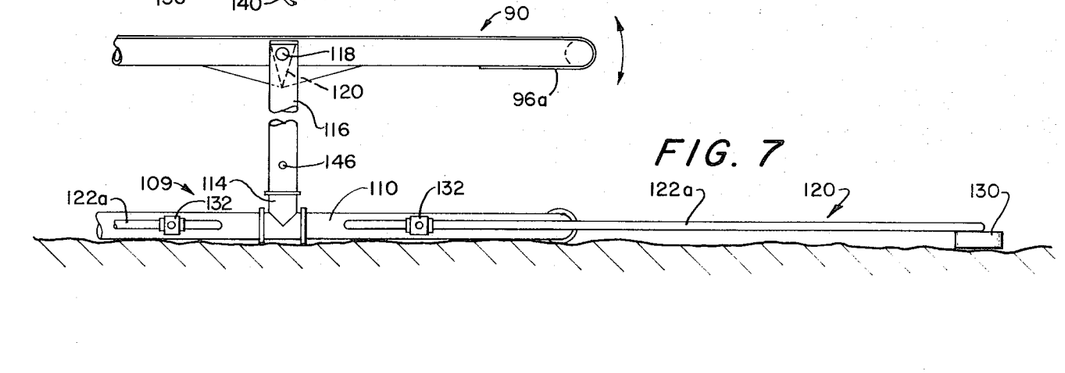
FIG. 7 is a fragmentary side elevational view of the apparatus of FIG. 6.
Figure 8:
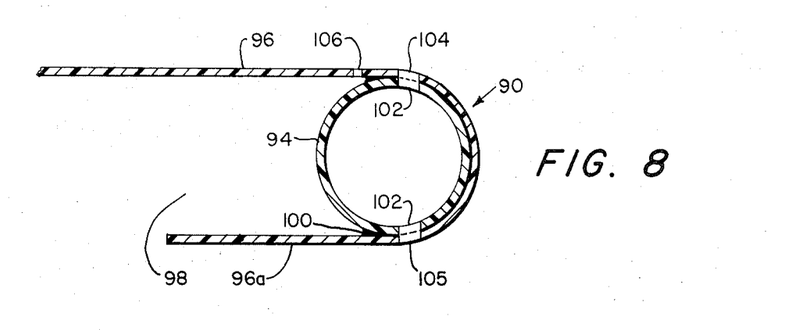
FIG. 8 is a view taken along line 8—8 of FIG. 6.

FIGS. 6–8 show a preferred embodiment of the invention. Although less than all of the apparatus is shown, it is to be understood that the apparatus is symmetrical in design on both sides of a vertical plane that includes the pivot axis hereinafter described. In this embodiment, the aerating body 90 has a rectangular frame made up of hollow pipes 94 whose ends are secured to each other by fluid tight connections. A wall member or diaphragm 96 overlies and is secured to the frame. The wall member not only extends fully across the open frame but also extends around and under its opposite ends as shown at 96a. These ends of wall member 96 are attached to the underside of the two long side frame members 94 so as to form a pocket or chamber 98 at each end of the body 90. These chambers are open on the side facing the pivot axis for the full interior width of the frame as shown in FIG. 8. It is to be noted that wall member 96 is preferably a sheet of a flexible, water-impervious plastic that is secured to the frame under tension by suitable means such as a cement shown at 100 in FIG. 8.

As shown in FIGS. 6 and 8, the pipe sections 94 that form the end members of the frame are provided with a series of upper and lower relatively large (e.g. one-half inch) vent holes 102 that are aligned with correspondingly sized holes 104 in the wall member 96. Additionally, one or more transversely extending rows of small spaced holes 106 are provided in the wall member 96 adjacent each of the end members of the frame. The interiors of the long side members of the frame of the aerating body may be filled with ballast, e.g. sand, as required for neutral or negative buoyancy purposes, and sealed off, e.g. by partitions 108 as shown in FIG. 6, so that they will not become filled with water.

The pivotal support for the aerating body 90 is in the form of a rectangular base 109 consisting of a plurality of hollow pipe sections 110 that are interconnected at the corners of the base by elbows 112. Each long side of the base consists of two pipe sections that are connected by a tee 114 in which is affixed an upright hollow pipe 116. Preferably the frame is made of rigid plastic pipes that are filled with a suitable ballast, e.g. sand, so that it will have negative buoyancy. The body 90 is pivotally supported on the upright pipes 110 by means of an axle 118 that extends through a hole in a baffle plate 120 and through holes in the opposite side frame members 94. The body and baffle are rotatable on axle 118. The baffle is secured to the body 90 and is tapered as shown. The axle is located at approximately the middle of body 90.

The apparatus of FIGS. 6–8 also includes supplementary aerating means, one at each end of the base 109. Each of these aeration means consists of a grid 120 of interconnected pipes 122 that are porous or are made of a non-porous material but modified so as to have a plurality of small air discharge holes 124 along their lengths. The pipes 122a and 122b forming the side sections of each grid are relatively long and are connected by elbows 124 to short pipe sections 126 that extend through holes in the adjacent side frame members of base 109 and are closed off by end caps 128. The pipe sections 126 are rotatable in the side frame members 110 so that the grids can be pivoted relative to the base 109. Lead feet 130 are attached to the grids at one or more places. These feet hold the grids down at the bottom of the liquid holder and also prevent the grids from being mired in any dirt or muck on the liquid holder bottom.

The pipe 122A of each grid assembly consists of two parts connected by a tee 132. These tees are connected by flexible hose lines 134 and flow control valves 136 to two different ports of a four-way pipe fitting 138. Another part of fitting 138 is connected by a flexible hose line 140 to a source of pressurized air, e.g., a variable speed air pump (not shown). The fourth part of fitting 138 is connected by a hose line 142 and another flow control valve 144 to one end of an air manifold in the form of a rigid pipe 146 that is anchored in and extends between the upright pipe sections 116. The opposite end of pipe 146 is closed off by an end cap. The manifold 146 has a row of small apertures each located at the 12 o'clock position, i.e. directly beneath the pivot axle 118, so that air discharged from these holes will tend to rise toward the baffle plate 120.

The operation of the apparatus of FIGS. 6–8 is as follows. Assuming that the body 90 is initially unbalanced so that one end is higher than the other, air is supplied under pressure to each of the grids 120 and also to the air manifold 146. The air escaping from the air manifold is deflected by the baffle plate 120 toward the low end of the body 90 and is trapped in the chamber 98 of that end. This trapped air exerts a buoyancy force on the low end of the body, causing the latter to pivot on axle 118 in a direction to raise the low end. The air trapped in the chamber 98 of the rising end escapes via holes 106 when that end has reached a determinable height, and effluent flows into that chamber to displace the escaping air. Concurrently, the baffle directs air from manifold 146 into the chamber 98 at the opposite end of the body 90, and this trapped air now exerts a buoyancy force that causes the body to pivot in the opposite direction far enough for this additional volume of trapped air to escape via the other set of holes 106. This seesaw action continues as long as air is discharged from the manifold at a suitable rate and the liquid level in the holder is at a sufficient level. This seesaw action provides aeration due to escape of air from holes 106. However, the bulk of the aeration is achieved by means of the grids 120. Air supplied to the grids escapes in small bubbles via the holes 124 and the rate at which these bubbles are produced is controlled by varying the volume flow of air in the lines 134.

It has been determined that locating the grids 120 below and laterally beyond the ends of the body 90 is advantageous since the air bubbles that are released by the grids are caused to undergo lateral movement as a result of wave motion produced in the liquid by the seesaw action of the body 90. The bubbles move laterally toward the pivot axis 118 as the adjacent end of the body 90 rises, and moves in the opposite direction as the same end drops down again, with the result that the aeration is more extensive that would be the case if the bubbles rose simply in a straight line.

The vent holes 102 and 104 facilitate up and down movement of the aerating body. They further facilitate its installation in a liquid holder. For installation purposes, the vent holes are covered with a waterproof adhesive tape while the frame members are filled with air. This allows the body 90 to be floated in the liquid holder out to where the base pivoted support is located. Then the tape is removed, whereupon the vent holes allow the frame to fill with water which causes it to sink for connection to its pivotal support.

It is to be appreciated that with each embodiment it is preferred but not essential that the seesawing body be fully submerged at all times in the liquid holder. Thus it is contemplated that each end of the aerating body may rise up far enough for its extremity to project out of the water. However, if aeration by small bubbles is the primary interest, the aerating body should not tilt far enough for the entrapped air to escape by passing around the underside of the end of the frame rather than via the holes, e.g. holes 30 of FIG. 2, provided for that purpose.

Of course it is not necessary that the baffle be aligned with the pivot axis. Instead the baffle may be displaced to one side or the other of the pivot axis. However, the baffle should be adapted to direct air to one end or the other of the body as herein described. It also is obvious that the pivot axis need not be exactly at the midpoint or center of gravity of the pivotally mounted body.

It is also to be appreciated that although the frame and base are preferably made of polymeric materials such as plastic, they also may be made of a suitable metal or metal alloy that is capable of withstanding corrosion in the effluent being treated. Plastic is preferred because of its low cost and because it is available in compositions which are resistant to many effluents and the solids suspended in such effluents. Making the frame and base of plastic or metal hollow pipe offers the advantage that the frame and base are thus adapted to accommodate suitable ballast to help maintain the device submerged in the effluent being treated. The amount of ballast required depends upon the size of the aerating body and also its weight, so that less ballast is required if the frame and base are made of metal or a metal alloy and more ballast is required if the frame and base are made of a plastic or wood. The ballast could be any relatively dense material such as lead; however, concrete, stone, sand or gravel are preferred because of lower cost. It also is recognized that if the aerating bodies, e.g. bodies 2 and 90 herein described, have neutral buoyancy as installed, less air is required to be trapped to cause it to pivot as described.

The top walls or diaphragms may be made of various materials. The essential requirement is that the material be impervious to the effluent and to the aerating fluid, sufficiently strong to withstand the operating pressure, and capable of being securely anchored to the frame. Preferably the diaphragm is made of a rigid plastic such as polyvinylchloride, polyethylene, polypropylene and the like. It is also contemplated that the diaphragm may be reinforced. This can be achieved by embedding reinforcing elements such as glass or metal filaments directly into the sheet material or by cementing reinforcing elements such as nylon tape directly to the surface of these sheets. The reinforcing elements also may be applied to the edges of the diaphragm so as to provide reinforcement in those locations. It also is clear that the frame and top wall may be all one piece and that the frame of FIGS. 1-5 are essentially skirts for the top wall members 12.

Of course, it is not necessary for the aerating body to be rectangular as shown. Thus, for example, the aerating body may be square, trapezoidal or may be circular.

Still other modifications will be obvious to persons skilled in the art.

It is believed to be apparent from the foregoing description that this invention offers a number of advantages. For one thing, the aeration body is relatively inexpensive and easy to construct and install. Secondly, it is easy to maintain and to remove for insepection and repair. Another advantage is that a plurality of these aerating bodies may be positioned in one lagoon at selected points to optimize aeration and agitation. Another advantage of the invention is that the aerating device may be installed in lagoons or tanks wherein effluent to be treated is introduced and removed periodically or in systems where effluent flows continuously at a slow rate in a long lagoon. A further advantage is that the aerating device agitates as well as aerates, with the result of more uniform dispersion of aerating fluid so that the amount of air required to produce a given B.O.D. level is minimized since a greater proportion of the air introduced is intimately contacted with the organic matter in the effluent. Of course, oxygen or some other oxygen-bearing gas may be used instead of air. The same aerating devices may be used to aerate stagnant ponds and pools, rivers and the like.

What is claimed is:

1. Apparatus for aerating and agitating a liquid in which it is submersed, said apparatus comprising a body and means pivotally supporting said body intermediate its opposite ends so that said body can undergo a seesaw motion whereby one of said ends is alternately higher and lower than the other of said ends, said body being adapted to trap at each end thereof when said each end is lower than the other end thereof a quantity of gas sufficient to exert a positive buoyancy force to that lower end, and means for releasing the gas trapped at each end of said body when said each end is higher than the other end thereof so as to eliminate the positive buoyancy force exerted by said trapped gas, and means for directing a molecular oxygen gas alternately to said opposite ends so that first one and then the other of said ends is subjected to said positive buoyancy force and said body will undergo said seesaw motion.

2. Apparatus according to claim 1 wherein said means for releasing gas comprises one or more holes at each end of said body.

3. Apparatus according to claim 1 wherein said body comprises an open frame and a fluid-impervious sheet attached to and extending across the upper side of said frame, said means for releasing gas comprising one or more holes in said sheet at each end of said body.

4. Apparatus according to claim 1 wherein said body comprises a fluid-impervious wall with means defining a skirt at each end thereof, and said means for releasing gas comprises one or more holes in said wall at each end thereof.

5. Apparatus according to claim 1 further including means defining a chamber at each end of said body, said chambers each being open on the side thereof facing the pivot point of said body for admittance of said gas, and further wherein said means for releasing gas comprises one or more holes in an upper wall of each of said chambers.

6. Apparatus according to claim 1 wherein said means for directing gas comprises means for discharging a gas below said body and a baffle moveable with said body for diverting said gas to one or the other ends of said body.

7. Apparatus according to claim 1 wherein said means for directing air comprises first and second gas discharge means located on opposite sides of the pivot axis of said body and means for alternately operating said gas discharge means.

8. Apparatus according to claim 1 further including means for adjusting the rate at which gas is directed to said opposite ends.

9. Apparatus according to claim 1 wherein said body comprises a frame constructed of tubular members, a stiff sheet overlying and secured to said frame, and a baffle carried by said body that subdivides the space within the confines of said frame and sheet into two gas-trapping chambers.

10. Apparatus according to claim 1 wherein the pivot axis of said body is located to one side of its center of gravity.

11. Apparatus according to claim 1 wherein said body includes at least one tubular member having an inlet port, means for feeding a gas into said at least one tubular member via said inlet port under pressure, and a plurality of small holes in said at least one tubular member for releasing said gas as small bubbles into the liquid in which said apparatus is submersed.

12. In combination with a holder for a liquid having lateral boundaries and a bottom, apparatus for simultaneously aerating and agitating said liquid, said apparatus comprising a body and means pivotally holding said body inmersed in said liquid, the pivot axis of said body being intermediate its ends, said body having an open bottom divided into two chambers disposed on opposite sides of said pivot axis, gas supply means, means for directing said gas to said chambers so as to alternately impart each end of said body an unbalancing positive buoyancy force, and means for leaking gas from one chamber as said gas is directed into the other chamber so as to cause said body to oscillate in a seesaw motion on its pivot axis.

13. The combination of claim 12 wherein said body comprises an open frame covered on one side by a waterproof sheet, and a baffle attached to said frame on the underside of said sheet, said baffle being disposed to direct said gas into one or the other of said chambers according to the angular position of said body on said pivot axis.

14. The combination of claim 13 wherein said means for leaking gas comprises holes in said sheet.

15. The combination of claim 14 further including means for adjusting rate of flow of gas from said gas supply means.

16. The combination of claim 12 wherein said body includes tubular members and further including means for pressuring said tubular members with gas and a plurality of holes in said tubular members for effecting release of gas from said tubular members.

17. The combination of claim 12 further including supplementary aeration means separate from said body.

18. The combination of claim 17 wherein said supplementary means comprises a grid of hollow tubular members and means for supplying gas to said hollow members, said hollow members having a plurality of holes for escape of said gas.

19. In combination with a holder for a liquid having lateral boundaries and a bottom, an aerating system comprising a body in said holder at least partially below the surface of said liquid, said body comprising a frame and a liquid-impervious cover extending across and covering the upper side of said frame, means pivotally supporting said frame at a point intermediate its ends, and means cooperating with said frame and said cover to define a chamber at each end of said frame, means for injecting a gas into the space below said frame and for directing said gas alternately to said chambers so as to impart a positive bouyancy force to first one end and then the opposite end of said body, said body being adapted to release gas from each chamber when the corresponding end of said body has swung upwardly to a predetermined angular position.

20. A method of agitating a body of liquid comprising submersing in said body a device that is adapted to pivot on a pivot axis located intermediate its ends, injecting a gas into one end of said device so as to cause that end to rise in said liquid, releasing gas from said one end as said one end moves above the level of said pivot axis so that said one end loses buoyancy, injecting gas into the other end of said device so as to cause said other end to rise in said liquid, releasing gas from said other end as said other end moves above the level of said pivot axis so that said other end loses buoyancy, and continuing to alternately inject and release gas as described so that said body undergoes a continuous seesaw motion about said pivot axis.

* * * * *

UNITED STATES PATENT OFFICE
CERTIFICATE OF CORRECTION

Patent No. 3,788,616    Dated January 29, 1974

Inventor(s) Roy L. Clough

It is certified that error appears in the above-identified patent and that said Letters Patent are hereby corrected as shown below:

In claim 12, column 10, line 57, after the word "impart" insert the word "to".

Signed and sealed this 30th day of July 1974.

(SEAL)
Attest:

McCOY M. GIBSON, JR.
Attesting Officer

C. MARSHALL DANN
Commissioner of Patents